(12) United States Patent
Chiang et al.

(10) Patent No.: US 11,954,032 B2
(45) Date of Patent: Apr. 9, 2024

(54) APPARATUS FOR MANAGING BUFFERS AND METHOD THEREOF

(71) Applicant: Cortina Access, Inc., San Jose, CA (US)

(72) Inventors: Mark Tsung-Han Chiang, San Jose, CA (US); Mei-Yao Lin, San Jose, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 153 days.

(21) Appl. No.: 17/582,033

(22) Filed: Jan. 24, 2022

(65) Prior Publication Data

US 2023/0236975 A1 Jul. 27, 2023

(51) Int. Cl.
*G06F 12/0815* (2016.01)

(52) U.S. Cl.
CPC .. *G06F 12/0815* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 6,970,457 B1 * | 11/2005 | Richards | H04L 12/5602 370/418 |
| 7,730,238 B1 * | 6/2010 | Arulambalam | H04L 49/9047 710/52 |
| 7,802,028 B2 | 9/2010 | Andersen et al. | |
| 2009/0037495 A1 | 2/2009 | Kumar et al. | |
| 2022/0269434 A1 * | 8/2022 | Shin | G06F 3/0683 |
| 2023/0120745 A1 * | 4/2023 | Aibester | H04L 49/103 370/412 |

FOREIGN PATENT DOCUMENTS

| | | |
|---|---|---|
| CN | 1595905 A | 3/2005 |
| CN | 103914265 B | 11/2016 |
| CN | 105022700 B | 12/2017 |
| TW | I340572 B | 4/2011 |

OTHER PUBLICATIONS

Cohen et al. (A Dynamic Approach for Efficient TCP Buffer Allocation, 0-8186-9014-3 1998 IEEE, pp. 817-824) (Year: 1998).*

* cited by examiner

*Primary Examiner* — Kaushikkumar M Patel
(74) *Attorney, Agent, or Firm* — McClure, Qualey & Rodack, LLP (57) ABSTRACT

An apparatus for managing buffers and a method thereof are provided. The method for managing buffers includes: receiving a plurality of pieces of data, where the plurality of pieces of data includes a first piece of data and a second piece of data; allocating at least one buffer to establish a cluster buffer according to a data amount of the first piece of data; and if at least one of a first condition and a second condition is satisfied, ending a storage operation of the cluster buffer, where the first condition is that a total remaining space of the at least one buffer that has stored the data in the cluster buffer is less than a remaining space threshold, and the second condition is that the quantity of the at least one buffer that has stored the data in the cluster buffer reaches a cluster threshold.

14 Claims, 7 Drawing Sheets

APPARATUS FOR MANAGING BUFFERS AND METHOD THEREOF

BACKGROUND

Technical Field

The instant disclosure relates to a technology for managing buffers, and in particular, to an apparatus for managing buffers and a method thereof.

Related Art

In a current network device, to support a wide range of packet sizes, storage management and utilization of a buffer pool become difficult. When a small-capacity buffer is used and a huge data packet needs to be stored, a plurality of buffers needs to be connected, which increases the resource consumption in managing the buffers. If a large-capacity buffer is used, storage space of the large-capacity buffer cannot be used effectively when storing a small data packet, and bandwidth utilization of a memory transmission interface cannot be improved either.

SUMMARY

An embodiment of the instant disclosure provides a method for managing buffers, including: receiving a plurality of pieces of data, where the plurality of pieces of data includes a first piece of data and a second piece of data; allocating at least one buffer to establish a cluster buffer according to a data amount of the first piece of data; storing the first piece of data in the cluster buffer; and if at least one of a first condition and a second condition is satisfied, ending a storage operation of the cluster buffer, where the first condition is that a total remaining space of the at least one buffer that has stored the first piece of data in the cluster buffer is less than a remaining space threshold, and the second condition is that the quantity of the at least one buffer that has stored the data in the cluster buffer reaches a cluster threshold.

An embodiment of the instant disclosure provides an apparatus for managing buffers, including: a receiving port, a buffer pool, a management circuit, and an output port. The receiving port is configured to receive a plurality of pieces of data. The buffer pool includes a plurality of buffers. The management circuit is configured to allocate at least one buffer to establish a cluster buffer according to a data amount of the first piece of data, and store the first piece of data in the cluster buffer; and if at least one of a first condition and a second condition is satisfied, end a storage operation of the cluster buffer, where the first condition is that a total remaining space of the at least one buffer that has stored the data in the cluster buffer is less than a remaining space threshold, and the second condition is that the quantity of the at least one buffer that has stored the data in the cluster buffer reaches a cluster threshold. The output port is configured to output the data stored in the cluster buffer whose storage operation has ended.

The apparatus for managing buffers and the method for managing buffers according to some embodiments of the instant disclosure can increase space utilization of the buffer, alleviate transmission delay, and enhance the utilization of a memory transmission interface, and can be flexibly applicable to data of different data amount (packet). In some embodiments, an adaptively adjustable cluster threshold can further play the role of quality of service (QoS).

DETAILED DESCRIPTION

Figure 1:
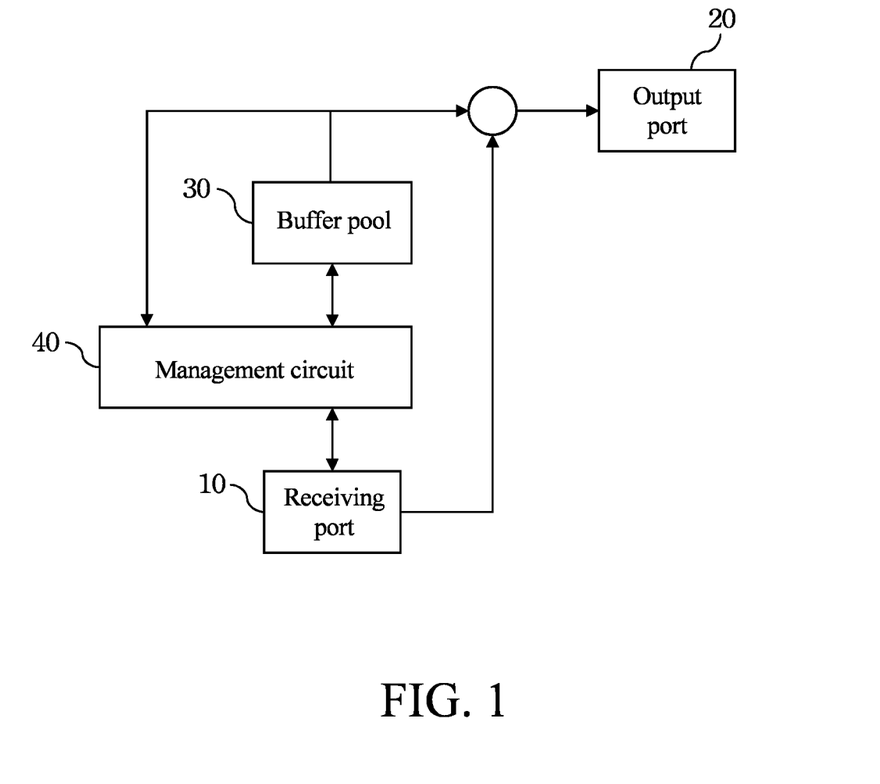
FIG. 1 is a schematic diagram of an apparatus for managing buffers according to an embodiment of the instant disclosure.
Figure 6:
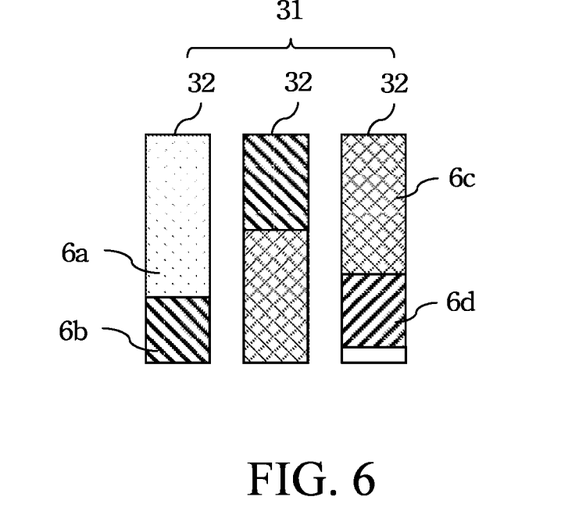
FIG. 6 is a schematic diagram of a cluster buffer satisfying a first condition according to an embodiment of the instant disclosure.

FIG. 1 is a schematic diagram of an apparatus for managing buffers according to an embodiment of the instant disclosure. The apparatus for managing buffers includes a receiving port 10, an output port 20, a buffer pool 30, and a management circuit 40. The buffer pool 30 includes a plurality of buffers 32 (as shown in FIG. 6). The buffer pool 30 is located in a transient memory. The transient memory may be a transient computer-readable medium such as a static random access memory (SRAM) or a dynamic random access memory (DRAM). A capacity of each buffer 32 can be defined, for example, the capacity can be 32 bytes, 64 bytes, 128 bytes, 256 bytes, 512 bytes, 1024 bytes, 2048 bytes, 4096 bytes, 8192 bytes, or 16384 bytes. The receiving port 10 is configured to receive a plurality of pieces of data. One receiving port 10 and one output port 20 are taken as an example herein, but the instant disclosure is not limited to this quantity. There can be one or more receiving ports 10, and there can also be one or more output ports 20, which can be adjusted appropriately according to actual application requirements.

Figure 2:
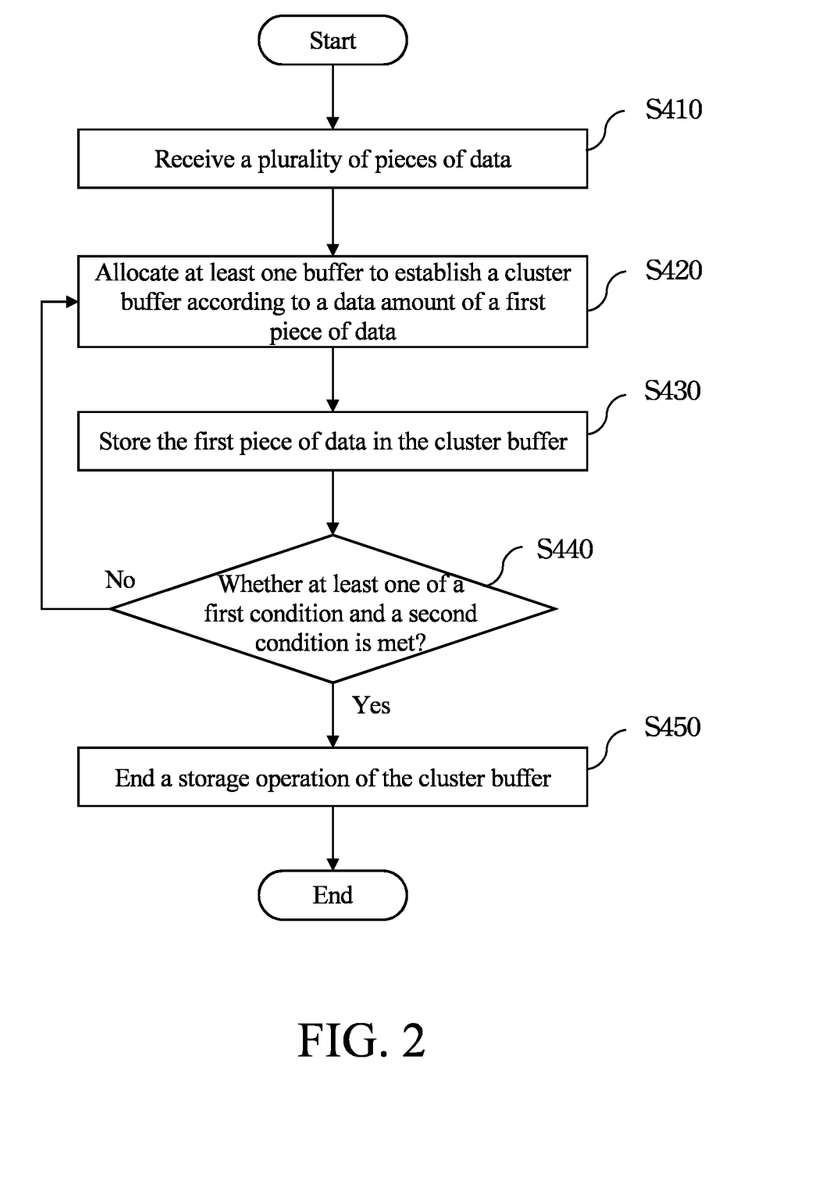
FIG. 2 is a flowchart of a method for managing buffers according to an embodiment of the instant disclosure.

The management circuit 40 performs a method for managing the buffers 32 to manage resource allocation of the buffers 32 in the buffer pool 30. FIG. 2 is a flowchart of a method for managing the buffers 32 according to an embodiment of the instant disclosure. First, in step S410, a plurality of pieces of data is received. For ease of description, herein, current data to be stored in the buffer pool 30 is referred to as a first piece of data, and next data of the first piece of data is referred to as a second piece of data. In this specification, a packet is used as an example for a piece of data, which can be a complete packet or a part of the packet (such as a payload), but the instant disclosure is not limited thereto. When the method for managing the buffers 32 is applied to other fields, the data can be another type of data. Next, in step S420, at least one buffer 32 is allocated to establish a cluster buffer 31 according to a data amount of the first piece of data. The at least one buffer 32 is allocated from the buffer pool 30. In step S430, the first piece of data is stored in the cluster buffer 31. Next, in step S440, it is confirmed whether a first condition or a second condition is satisfied. The first condition is that a total remaining space of the at least one buffer 32 storing the data in the cluster buffer 31 is less than a remaining space threshold. The second condition is that the quantity of the at least one buffer 32 storing the data in the cluster buffer 31 reaches a cluster threshold, that is, is at least the cluster threshold, that is, is greater than or equal to the cluster threshold. If either one of the first condition and the second condition is satisfied or the two conditions are both satisfied, step S450 is performed to end a storage operation of the cluster buffer 31, which means that the data is forbidden to be stored in the cluster buffer 31, but is available for output. If neither the first condition nor the second condition is satisfied, go back to step S420 to continue to store next data in the cluster buffer 31, that is, to perform step S420 and step S430 again with the second piece of data as the first piece of data of a new round. A specific example will be used below for description, and an example in which the remaining space threshold is set to 90% of a capacity of one buffer 32 and the cluster threshold is set to 5 is taken.

Figure 3:
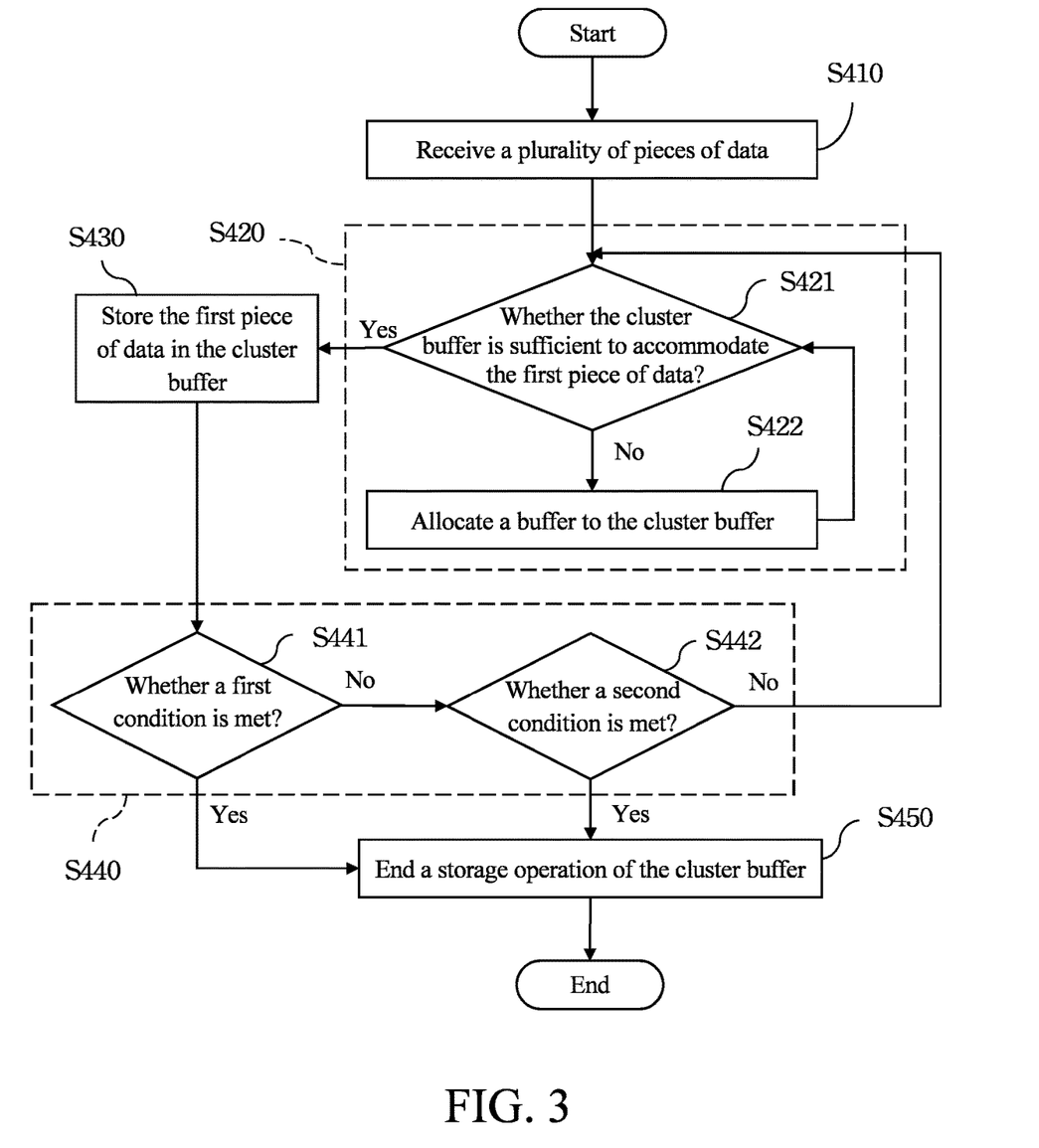
FIG. 3 is a detailed flowchart of a method for managing buffers according to an embodiment of the instant disclosure.
Figure 4:
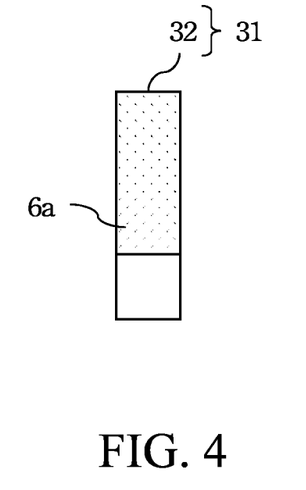
FIG. 4 is a schematic diagram of a cluster buffer in which a first piece of data is placed according to an embodiment of the instant disclosure.

FIG. 3 is a detailed flowchart of a method for managing the buffers 32 according to an embodiment of the instant disclosure. Compared with FIG. 2, FIG. 3 further presents detailed steps of step S420 and step S440. Step S420 includes step S421 and step S422; and step S440 includes step S441 and step S442. FIG. 4 is a schematic diagram of a cluster buffer 31 in which a first piece of data 6a is placed according to an embodiment of the instant disclosure. Refer to FIG. 3 and FIG. 4 together. When a new cluster buffer 31 is established, in step S421, it is determined that the cluster buffer 31 is not sufficient to accommodate the first piece of data because no buffer 32 has been allocated to establish the cluster buffer 31, and step S422 is performed. In step S422, a buffer 32 is allocated to establish the new cluster buffer 31. Next, go back to step S421 to confirm again whether a remaining space of the buffer 32 in the cluster buffer 31 is sufficient to accommodate the data. In this way, by repeatedly performing step S421 and step S422, the cluster buffer 31 being sufficient to place the first piece of data can be established. If the first piece of data 6a can be completely placed in the buffer 32, step S430 is performed to store the first piece of data 6a in the buffer 32 (as shown in FIG. 4).

Next, step S441 is performed to confirm whether the foregoing first condition is satisfied. In an example shown in FIG. 4, the remaining space (blank part) of the buffer 32 storing the first piece of data 6a still exceeds the remaining space threshold; and therefore, the first condition is not satisfied, and step S442 is performed. In an example shown in FIG. 4, in this case, the quantity of the buffer 32 in the cluster buffer 31 is one, which is lower than the cluster threshold. Therefore, the second condition is not satisfied, and go back to step S421 to confirm whether the remaining space of the cluster buffer 31 is sufficient to store the next data (that is, the second piece of data 6b).

Figure 5:
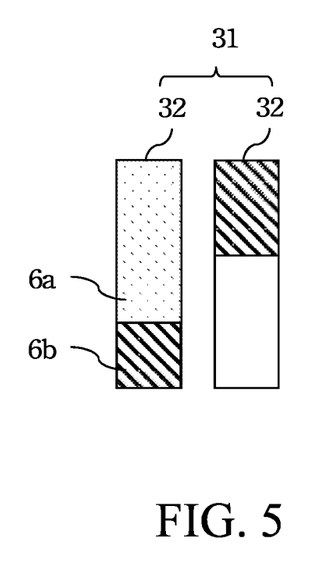
FIG. 5 is a schematic diagram of a cluster buffer in which a second piece of data is placed according to an embodiment of the instant disclosure.

FIG. 5 is a schematic diagram of a cluster buffer 31 in which a second piece of data 6b is placed according to an embodiment of the instant disclosure. After a first piece of data 6a is placed, a remaining space of a buffer 32 is not sufficient to accommodate the second piece of data 6b, so step S422 is performed to allocate another buffer 32 to the cluster buffer 31, and the cluster buffer 31 has two buffers 32 after the allocation. Then, go back to step S421 to confirm whether the remaining space of the cluster buffer 31 is sufficient to accommodate the second piece of data 6b. In this case, the remaining space can accommodate the second piece of data 6b. Therefore, step S430 is performed to store the second piece of data 6b in the cluster buffer 31. A manner of storing is to store the data to be stored following the end of the last stored data. Next, step S440 is performed to determine whether the first condition or the second condition is satisfied. In this case, these two conditions are still not satisfied, so go back to step S421 again to determine whether the remaining space can accommodate next data (that is, a third piece of data 6c).

FIG. 6 is a schematic diagram of a cluster buffer 31 satisfying a first condition according to an embodiment of the instant disclosure. After the third piece of data 6c and a fourth piece of data 6d are successively placed in the foregoing process, in step S441, it is confirmed whether the first condition is satisfied. In this case, the remaining space (blank part) of the cluster buffer 31 is less than the remaining space threshold, which satisfies the first condition. Therefore, step S450 is performed to end the storage operation of the cluster buffer 31. Therefore, the storage operation of the cluster buffer 31 can be ended when the data is stored at a boundary of the buffer 32, and the space utilization of the buffer 32 can be enhanced as much as possible. The output port 20 can output the data (that is, packet) stored in the cluster buffer 31 whose storage operation has ended. After the data is removed from the cluster buffer 31, the management circuit 40 can release the buffer 32 in the cluster buffer 31 back to the buffer pool 30. It is worth noting that, in an example in FIG. 6, the quantity of the buffers 32 does not reach the cluster threshold, that is, the packet can be sent out in advance without waiting until the quantity of the buffers 32 is equivalent to the cluster threshold, which can alleviate transmission delay.

Figure 7:
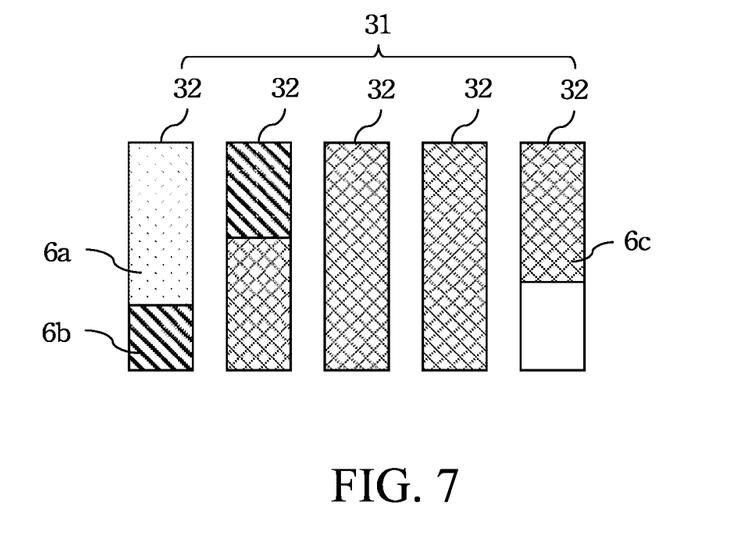
FIG. 7 is a schematic diagram of a cluster buffer satisfying a second condition according to an embodiment of the instant disclosure.

FIG. 7 is a schematic diagram of a cluster buffer 31 satisfying a second condition according to an embodiment of the instant disclosure. In this example, after the first piece of data 6a and the second piece of data 6b are stored, because several buffers 32 are needed to place the data amount of the third piece of data 6c, the third piece of data 6c can be placed into the cluster buffer 31 with five buffers 32 after step S421 and step S422 are performed a plurality of times. In this case, in step S440, it is confirmed that although the first condition is not satisfied, the quantity of the buffers 32 of the cluster buffer 31 reaches the cluster threshold to satisfy the second condition, so step S450 is performed to end the storage operation of the cluster buffer 31. In this way, after a certain capacity is accumulated, the data can be sent out again, which can effectively enhance the utilization of a memory transmission interface.

Figure 8:
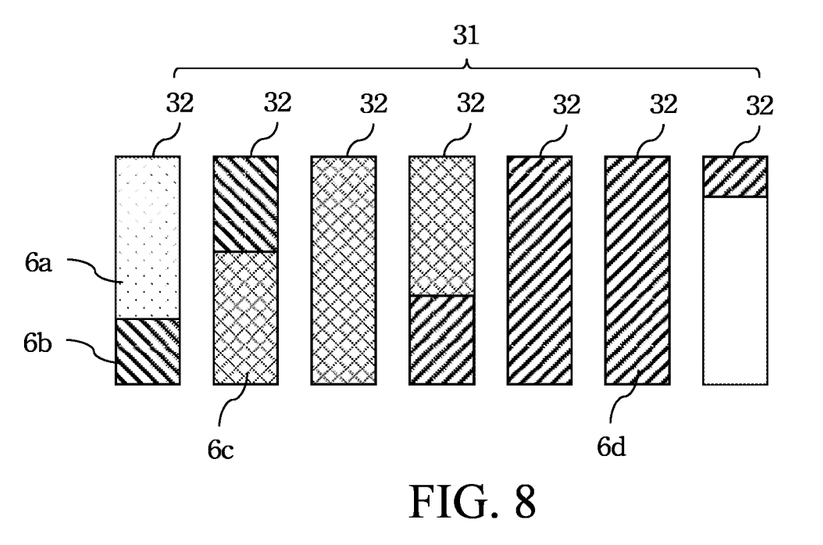
FIG. 8 is a schematic diagram of a cluster buffer in which the quantity of buffers exceeds a cluster threshold according to an embodiment of the instant disclosure.

FIG. 8 is a schematic diagram of a cluster buffer 31 in which the quantity of buffers 32 exceeds a cluster threshold according to an embodiment of the instant disclosure. After the first piece of data 6a to the third piece of data 6c are stored, because neither the first condition nor the second condition is satisfied, go back to step S421 to confirm whether the remaining space of the cluster buffer 31 is sufficient to accommodate the fourth piece of data 6d. To enable the fourth piece of data 6d to be placed, three additional buffers 32 are added through step S421 and step S422. Therefore, in step S440, it is confirmed that the second condition is satisfied, and step S450 is performed to end the storage operation of the cluster buffer 31. This example indicates that although the cluster threshold is set in the instant disclosure, the quantity of the buffers 32 of the cluster buffer 31 may exceed the cluster threshold to support buffering of huge data.

Figure 9:
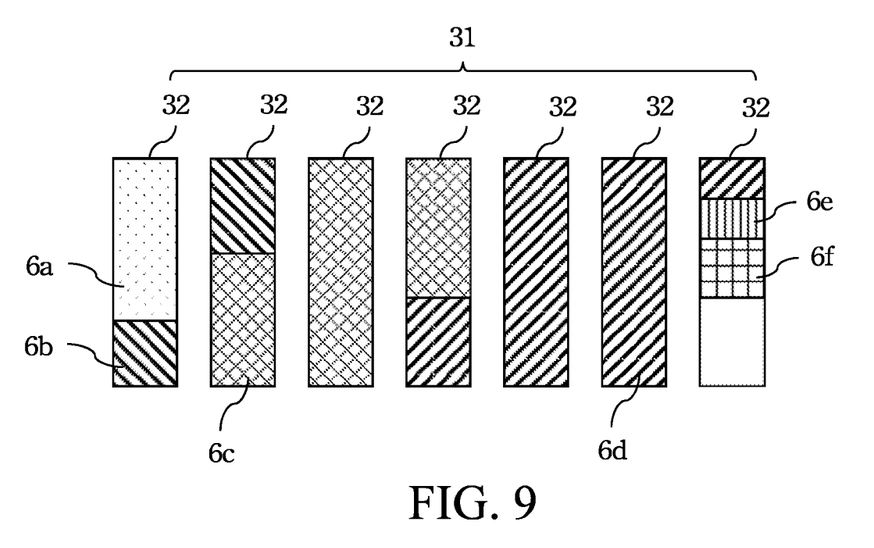
FIG. 9 is a schematic diagram of a cluster buffer storing additional data according to an embodiment of the instant disclosure.
Figure 10:
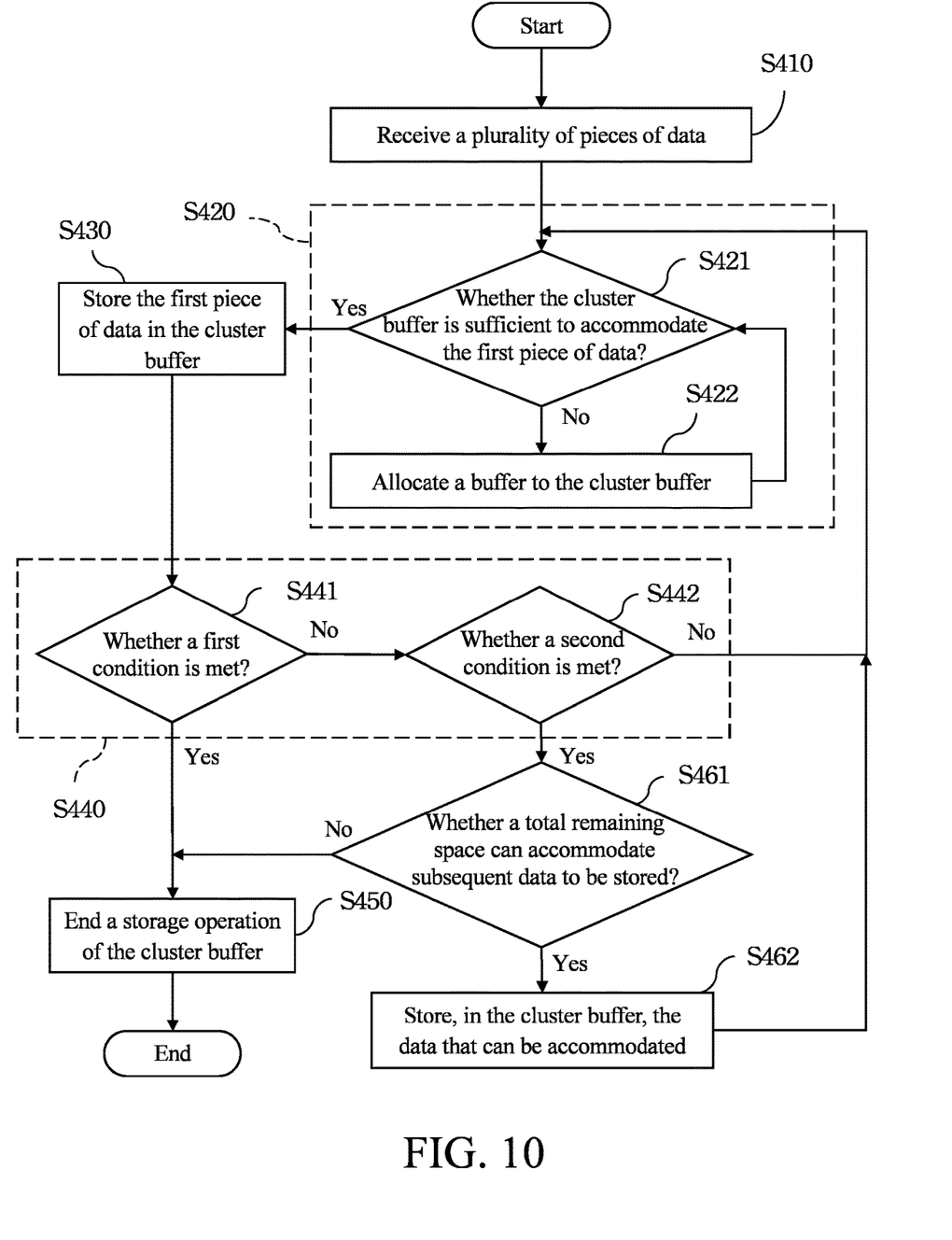
FIG. 10 is a detailed flowchart of a method for managing buffers according to another embodiment of the instant disclosure.

Refer to FIG. 8 to FIG. 10 together. FIG. 9 is a schematic diagram of a cluster buffer 31 storing additional data according to an embodiment of the instant disclosure. FIG. 10 is a detailed flowchart of a method for managing buffers 32 according to another embodiment of the instant disclosure. Compared with FIG. 3, FIG. 10 further includes step S461 and step S462. In step S442, when it is confirmed that the second condition is satisfied, step S450 is not directly performed, but step S461 is first performed. Using FIG. 8 as an example, after the fourth piece of data 6d is placed, in step S461, it is confirmed whether the total remaining space (blank part) of the cluster buffer 31 can accommodate at least one piece of subsequent data. If yes, the at least one piece of data that can be accommodated is stored in the cluster buffer 31 (step S462). In an example shown in FIG. 9, two pieces of additional data are stored (a fifth piece of data 6e and a sixth piece of data 6f). If there is not enough space, the cluster buffer 31 is closed (step S450). If FIG. 4 is used as an example, in step S461, it is confirmed whether the total remaining space of the cluster buffer 31 can accommodate the second piece of data 6b. If yes, the second piece of data 6b is stored in the cluster buffer 31. Therefore, the remaining space can be further fully utilized, and the space utilization of the buffer 32 can be enhanced as much as possible.

In some embodiments, the cluster threshold is programmable, and is determined according to a priority of first piece of data 6a. More specifically, the cluster threshold is negatively correlated with the priority of the first piece of data 6a. For example, the priority is a transmission priority of the packet, so that the cluster buffer 31 storing a packet with a higher priority can satisfy the second condition faster (the cluster threshold is smaller), and the packet with the higher priority can be forwarded as soon as possible to play the role of QoS.

In some embodiments, the priority of the first piece of data 6a and a priority of the second piece of data 6b are the same.

In some embodiments, before ending the storage operation of the cluster buffer 31 (i.e., before performing step S450), it is further confirmed whether the priority of the first piece of data 6a and the priority of the second piece 6b of data are the same. If no, step S450 is performed to end the storage operation of the cluster buffer 31.

In some embodiments, a plurality of cluster buffers 31 are established according to the number of priority levels, and each cluster buffer 31 has a corresponding cluster threshold, and the cluster threshold of each cluster buffer 31 is related to the priority of data stored in the cluster buffer 31.

In some embodiments, the remaining space threshold is set to 90% to 95% of the capacity of one buffer 32.

In some embodiments, step S441 and step S442 are performed interchangeably, namely, step S442 is performed first and then step S441 is performed.

In some embodiments, the apparatus for managing buffers is a network device such as a gateway, a network modem, a router, or a wireless network access point.

In some embodiments, the management circuit 40 can be implemented by using a microprocessor, a complex programmable logic device (CPLD), a field-programmable gate array (FPGA), a logic circuit, an analog circuit, a digital circuit, and/or any processing element for operating a signal (analog and/or digital) based on an operating instruction.

In summary, the apparatus for managing buffers and the method for managing buffers 32 provided in some embodiments of the instant disclosure can increase space utilization of the buffer 32, alleviate transmission delay, and enhance the utilization of a memory transmission interface, and can be flexibly applicable to data of different data amount (packet). In some embodiments, an adaptively adjustable cluster threshold can further play the role of QoS.

What is claimed is:

1. A method for managing buffers, comprising:
receiving a plurality of pieces of data, wherein the plurality of pieces of data comprises a first piece of data and a second piece of data;
allocating at least one buffer to establish a cluster buffer according to a data amount of the first piece of data;
storing the first piece of data in the cluster buffer; and
if at least one of a first condition and a second condition is satisfied, ending a storage operation of the cluster buffer, wherein
the first condition is that a total remaining space of the at least one buffer that has stored the data in the cluster buffer is less than a remaining space threshold, and the second condition is that the quantity of the at least one buffer that has stored the data in the cluster buffer reaches a cluster threshold,
before ending the storage operation of the cluster buffer, confirming whether the total remaining space is capable of accommodating the second piece of data, and if yes, storing the second piece of data in the cluster buffer, wherein a priority of the first piece of data and a priority of the second piece of data are the same.

2. The method according to claim 1, wherein if neither the first condition nor the second condition is satisfied, the second piece of data continues to be stored in the cluster buffer.

3. The method according to claim 1, further comprising:
before ending the storage operation of the cluster buffer, confirming whether a priority of the first piece of data and a priority of the second piece of data are the same, and if no, then ending the storage operation of the cluster buffer.

4. The method according to claim 1, wherein the step of allocating at least one buffer to establish a cluster buffer comprises:
allocating one buffer to establish the cluster buffer; and
confirming whether the cluster buffer is sufficient to accommodate the first piece of data; and if no, then allocating another buffer to the cluster buffer.

5. The method according to claim 1, wherein a plurality of cluster buffers are established according to the number of priority levels, and each cluster buffer has a corresponding cluster threshold, and the cluster threshold of each cluster buffer is related to the priority of data stored in the cluster buffer.

6. A method for managing buffers, comprising:
receiving a plurality of pieces of data, wherein the plurality of pieces of data comprises a first piece of data and a second piece of data;
allocating at least one buffer to establish a cluster buffer according to a data amount of the first piece of data;
storing the first piece of data in the cluster buffer; and
if at least one of a first condition and a second condition is satisfied, ending a storage operation of the cluster buffer, wherein the first condition is that a total remaining space of the at least one buffer that has stored the data in the cluster buffer is less than a remaining space threshold, and the second condition is that the quantity of the at least one buffer that has stored the data in the cluster buffer reaches a cluster threshold, wherein the cluster threshold is determined according to a priority of the first piece of data.

7. The method according to claim 6, wherein the cluster threshold is negatively correlated with the priority of the first piece of data.

8. An apparatus for managing buffers, comprising:
a receiving port, configured to receive a plurality of pieces of data, wherein the plurality of pieces of data comprises a first piece of data and a second piece of data;
a buffer pool, comprising a plurality of buffers;
a management circuit, configured to establish a cluster buffer comprising at least one buffer according to a data amount of the first piece of data, and store the first piece of data in the cluster buffer; and
if at least one of a first condition and a second condition is satisfied, end a storage operation of the cluster buffer,
wherein the first condition is that a total remaining space of the at least one buffer that has stored the data in the cluster buffer is less than a remaining space threshold, and the second condition is that the quantity of the at least one buffer that has stored the data in the cluster buffer reaches a cluster threshold; and
an output port, configured to output the data stored in the cluster buffer after the storage operation of the cluster buffer has ended,
wherein the management circuit, before ending the storage operation of the cluster buffer, confirms whether the total remaining space is capable of accommodating the second piece of data, and if yes, stores the second piece of data in the cluster buffer, wherein a priority of the first piece of data and a priority of the second piece of data are the same.

9. The apparatus according to claim 8, wherein if neither the first condition nor the second condition is satisfied, the second piece of data continues to be stored in the cluster buffer.

10. The apparatus according to claim 8, wherein the management circuit, before ending the storage operation of the cluster buffer, confirms whether a priority of the first piece of data and a priority of the second piece of data are the same, and if no, ends the storage operation of the cluster buffer.

11. The apparatus according to claim 8, wherein when establishing the cluster buffer, the management circuit allocates a sufficient quantity of buffers to store the first piece of data.

12. The apparatus according to claim 8, wherein the cluster threshold is determined according to a priority of the first piece of data.

13. The apparatus according to claim 12, wherein the cluster threshold is negatively correlated with the priority of the first piece of data.

14. The apparatus according to claim 8, wherein the management establish a plurality of cluster buffers according to the number of priority levels, and each cluster buffer has a corresponding cluster threshold, and the cluster threshold of each cluster buffer is related to the priority of data stored in the cluster buffer.

* * * * *